United States Patent
Benedetti

(10) Patent No.: US 10,392,145 B2
(45) Date of Patent: Aug. 27, 2019

(54) APPARATUS FOR DOSING AND PACKAGING AGRICULTURAL PRODUCTS

(71) Applicant: UNITEC S.p.A., Lugo (RA) (IT)

(72) Inventor: Luca Benedetti, Savarna (IT)

(73) Assignee: UNITEC S.P.A., Lugo (RA) (IT)

( * ) Notice: Subject to any disclaimer, the term of this patent is extended or adjusted under 35 U.S.C. 154(b) by 225 days.

(21) Appl. No.: 15/516,357

(22) PCT Filed: Oct. 13, 2015

(86) PCT No.: PCT/IB2015/057830
§ 371 (c)(1),
(2) Date: Mar. 31, 2017

(87) PCT Pub. No.: WO2016/063174
PCT Pub. Date: Apr. 28, 2016

(65) Prior Publication Data
US 2017/0240308 A1    Aug. 24, 2017

(30) Foreign Application Priority Data

Oct. 23, 2014   (IT) .............................. PN2014A0054

(51) Int. Cl.
*B65B 1/32*   (2006.01)
*B65B 5/10*   (2006.01)
(Continued)

(52) U.S. Cl.
CPC .............. *B65B 35/405* (2013.01); *B65B 1/32* (2013.01); *B65B 5/10* (2013.01); *B65B 25/04* (2013.01); *B65B 57/10* (2013.01); *G01G 13/08* (2013.01)

(58) Field of Classification Search
CPC ........... G01G 13/04–13/08; B65B 1/32; B65B 25/04; B65B 35/405; B65B 57/10; B65B 5/10
See application file for complete search history.

(56) References Cited

U.S. PATENT DOCUMENTS 3,814,196 A * 6/1974 McClusky ................ B65B 1/22
                                                    177/123
4,662,409 A * 5/1987 Egli .......................... B65B 1/32
                                                    141/1
(Continued)

FOREIGN PATENT DOCUMENTS

| EP | 1 880 959 A1 | 1/2008 |
| WO | WO 02/20355 A1 | 3/2002 |
| WO | WO 2008/133530 A1 | 11/2008 |

*Primary Examiner* — Natalie Huls
(74) *Attorney, Agent, or Firm* — Birch, Stewart, Kolasch & Birch, LLP

(57) ABSTRACT

The object of the invention is to realize an apparatus for automatically and precisely filling single containers in succession with a pre-defined amount of products; each container is filled with two distinct loads of products, wherein the first load is determined according to its weight roughly measured, and the second load is determined numerically based on the difference between said first load and a pre-defined conventional weight; the apparatus comprises a first conveyor, a second conveyor loaded automatically with the products transported by the first conveyor, a third conveyor which is loaded with the agricultural products transported by the second conveyor and that transfers the products poured and present onto it inside a succession of single containers, weighing means able of weighing the total weight of the products on the whole present on the second conveyor, wherein the third conveyor is able of transferring the products poured and present on it in a succession of single containers; there is arranged a fourth conveying means preferably "V"-shaped and able of pouring a numerically controlled quantity of similar products onto the third conveying means, which, in the end, pours it onto a container below with a motion of going on and partial rotation.

15 Claims, 14 Drawing Sheets

Figure 1:
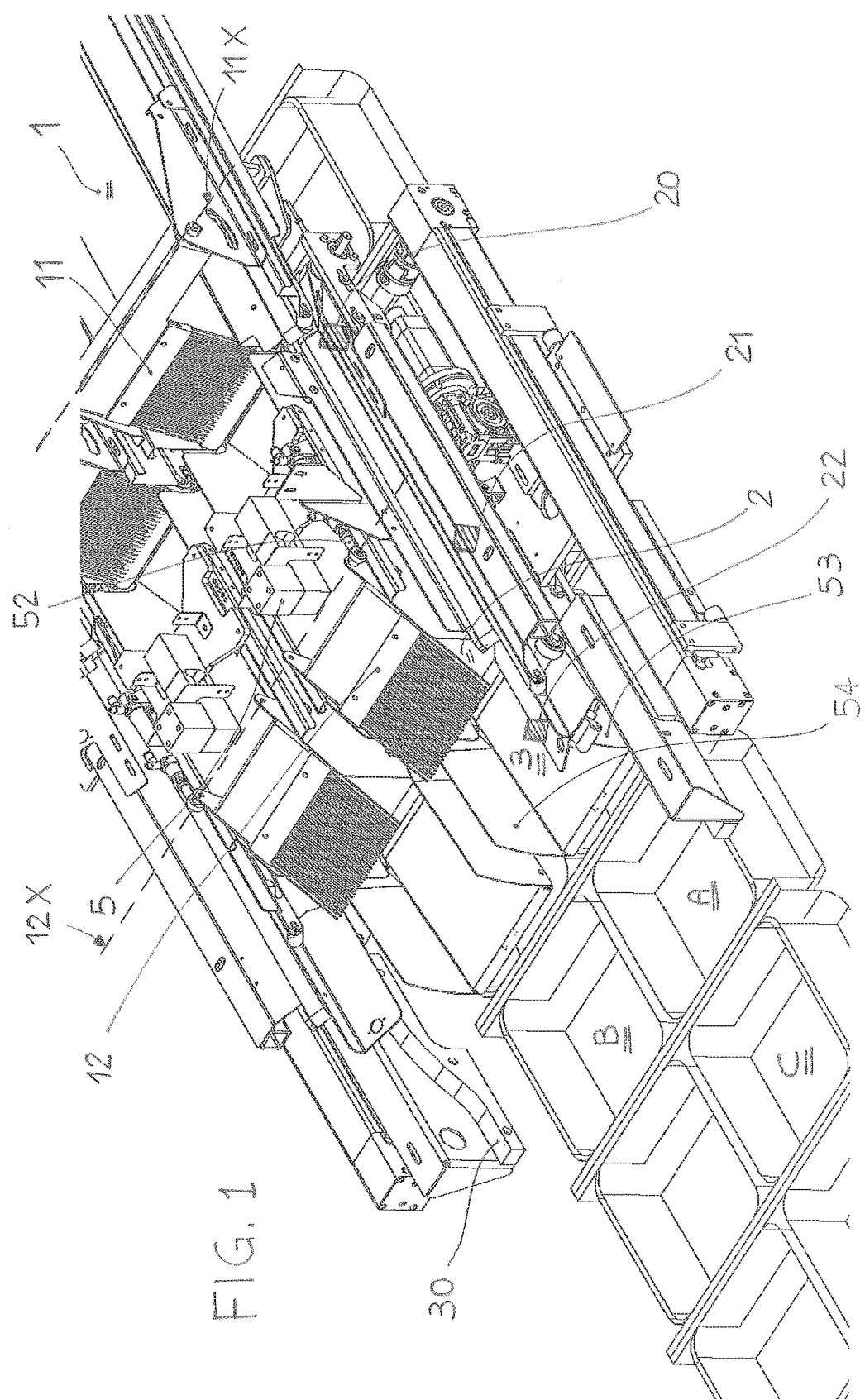

(51) Int. Cl.
*G01G 13/08* (2006.01)
*B65B 35/40* (2006.01)
*B65B 25/04* (2006.01)
*B65B 57/10* (2006.01)

(56) References Cited

U.S. PATENT DOCUMENTS

| | | | | |
|---|---|---|---|---|
| 5,325,653 | A * | 7/1994 | Boyd | B65B 25/046 141/128 |
| 5,979,512 | A * | 11/1999 | McGregor | B65B 1/32 141/10 |
| 6,016,643 | A * | 1/2000 | Andersen | B65B 1/46 53/244 |
| 6,121,556 | A * | 9/2000 | Cole | G01G 13/04 141/83 |
| 6,502,013 | B1 * | 12/2002 | Sosnik | G01G 13/06 177/116 |
| 2004/0144573 | A1 * | 7/2004 | Arnason | G01G 13/08 177/116 |
| 2004/0231895 | A1 * | 11/2004 | Hjalmarsson | G01G 13/04 177/121 |

* cited by examiner

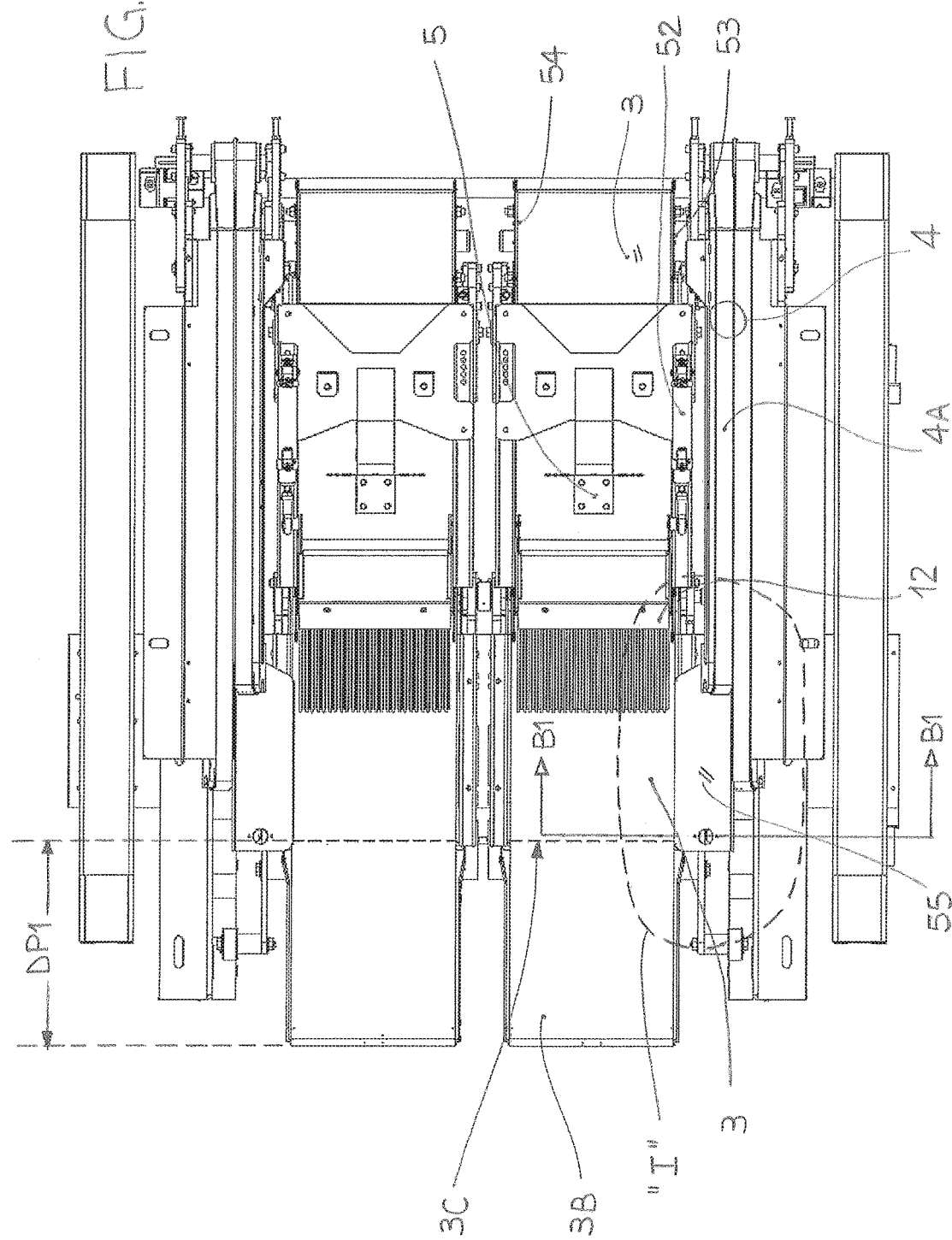

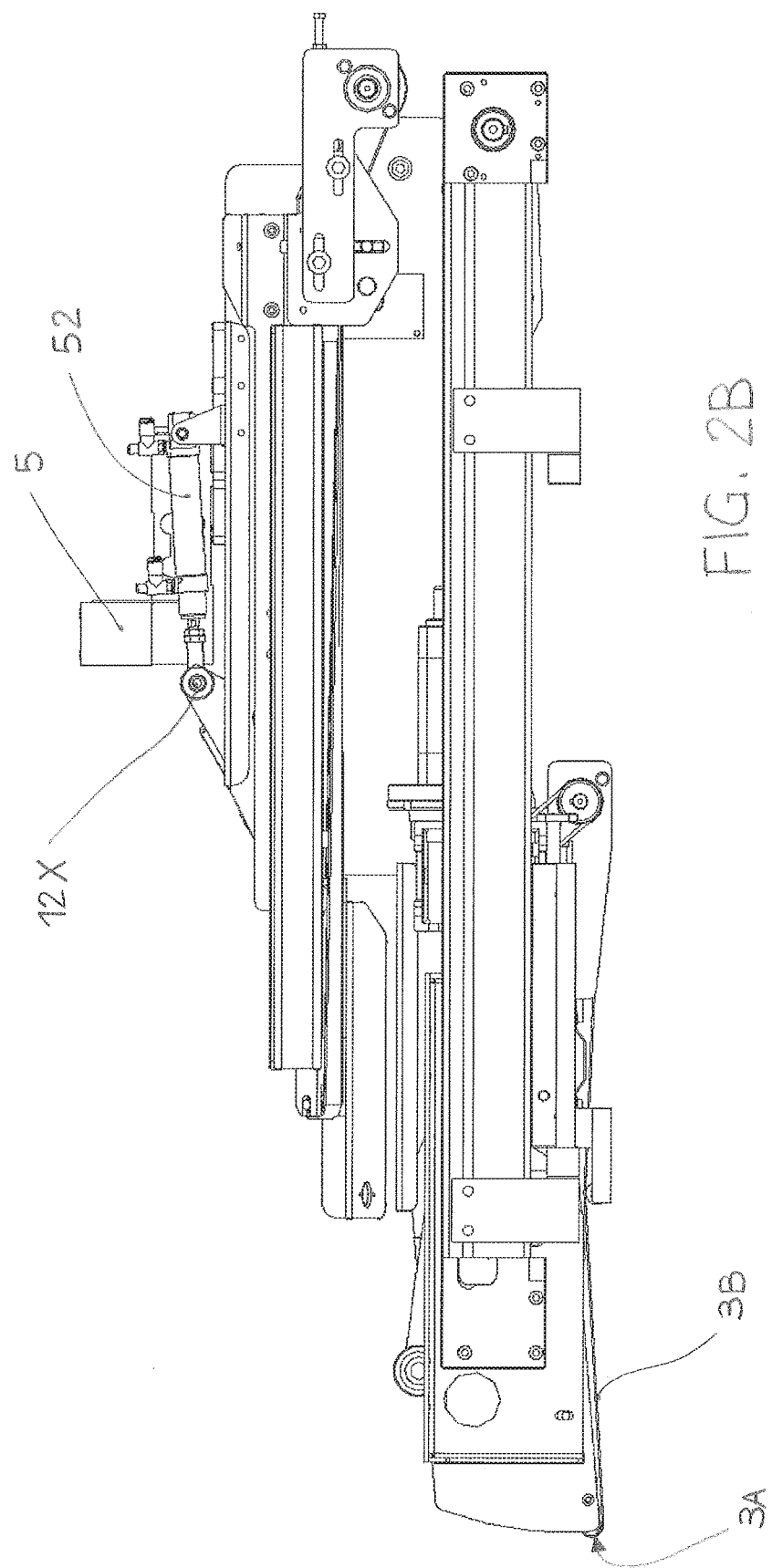

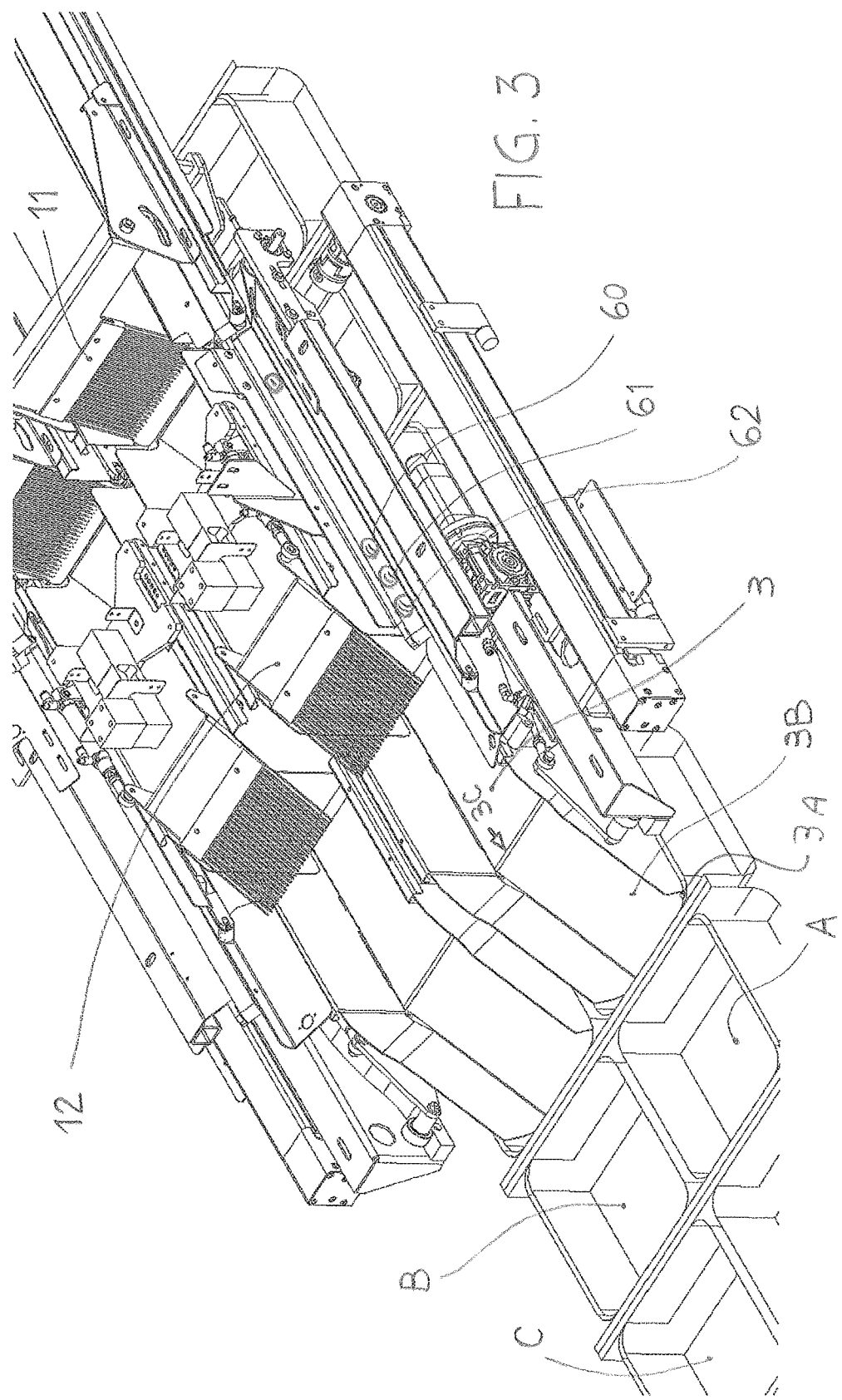

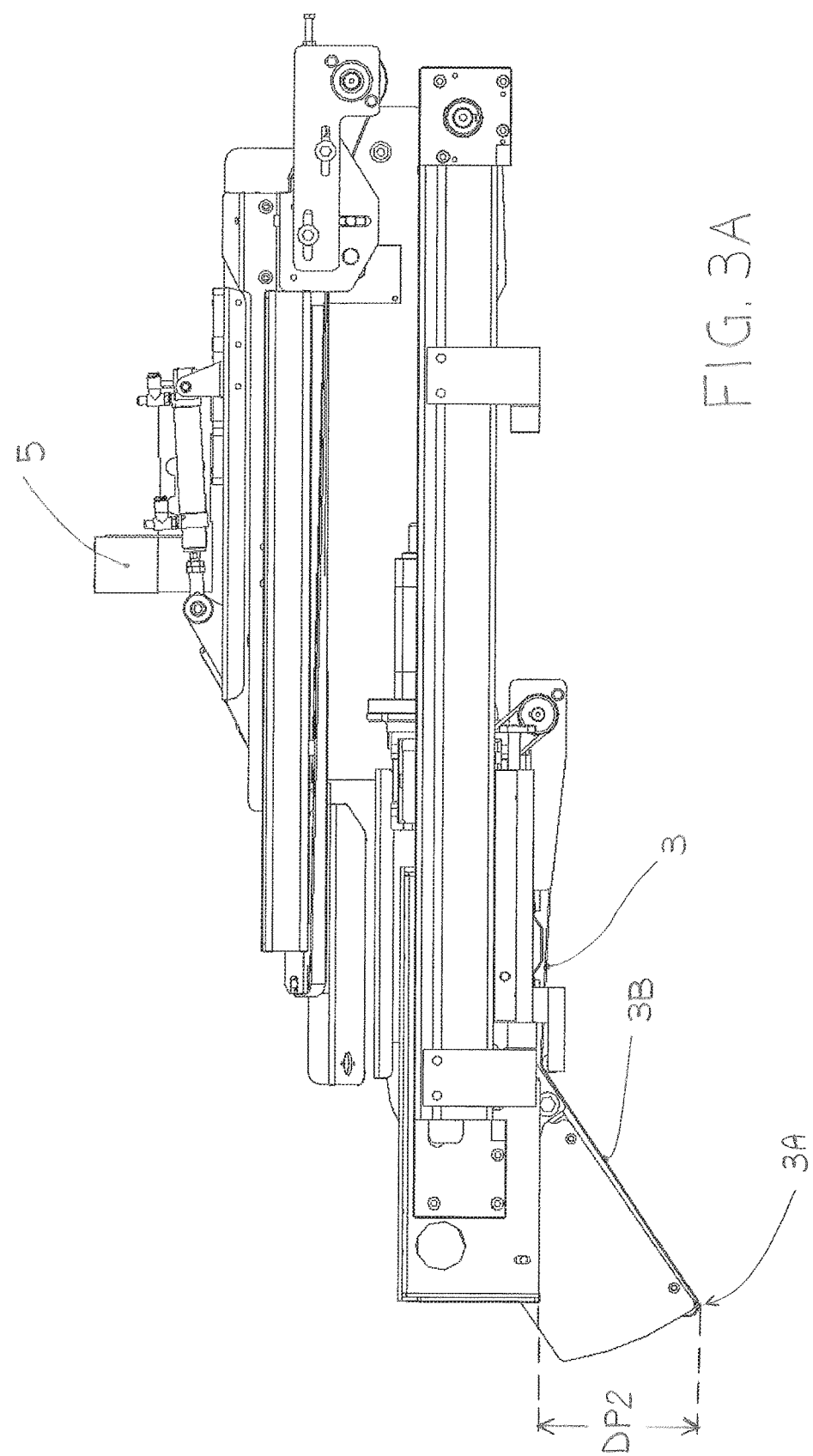

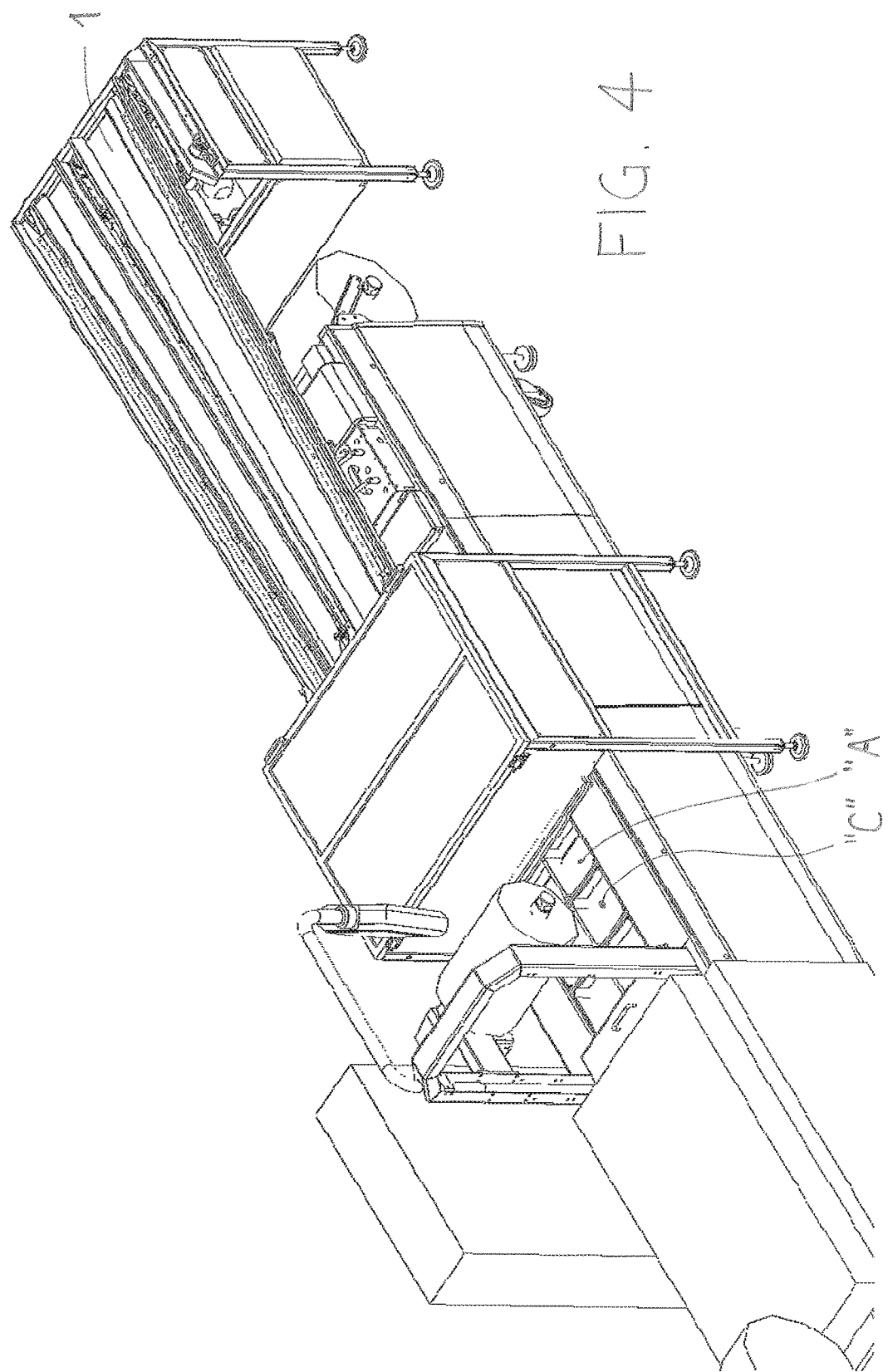

APPARATUS FOR DOSING AND PACKAGING AGRICULTURAL PRODUCTS

The present invention relates to an improved apparatus for making pre-defined "doses" of agricultural or vegetal products, and to their packaging in a totally automatic way.

Those products are presented both singularly and as an indistinct mass, that is in groups or in a continuous form and are transported in a substantially continuous way by a specific transport apparatus, and in succession, they have to be loaded into a plurality of containers or packages so that each of such packages is loaded with an amount of products such that their weight is not lower than a pre-defined minimum quantity.

In general the apparatuses of industrial/professional type for this purposes are widely known; for example the U.S. Pat. No. 6,016,643 describes an embodiment wherein the apparatus comprises a conveyor with rollers which form a plurality of respective "pockets" inside which a respective product is transported in a singularized way; at the end of said conveyor is arranged a container that is filled with the continuous succession of products transported by the respective pockets.

Said container is continuously weighed, so that it is possible to control in real time the weight increase of the whole quantity of the loaded products and compare, continuously and basically immediately, said total weight with a "target" reference amount.

The loading phase goes on until when the total weight of the loaded products reaches and exceeds such "target" amount, at this point the loading phase of that container being loaded stops, that container is led to a successive stage of handling/processing, and a new empty container is made ready, for which a new loading cycle is started.

It is clear that the purpose of such patent is to dose the load of each single container, hence avoiding to load an excessive quantity of products.

This solution seems efficient from the automation simplicity point of view; anyway, it shows two severe inconveniences:

the first inconvenience is caused by the fact that the load of the products occurs in a singularized way on the roller line, and this of course greatly limits the loading speed of the containers, and ultimately it greatly limits the overall productivity of the whole apparatus, which is not acceptable in a highly competitive productive field;

the second inconvenience is caused by the fact that the weight which is controlled is the weight of the whole container, also when it reaches the maximum load; in these conditions the precision of the measuring of the overall weight lowers progressively, that is it cannot be exactly discerned the product weight, which is inevitably loaded in the container in the short time interval between the detection of having reached the "target" weight and the moment of the final stop of the conveyor, with respect to the total weight of the full container.

Negative consequence of such effect is the possibility and frequency that an excessive quantity of products, largely exceeding said "target" amount, is loaded in the container.

This circumstance is of course unacceptable for expensive products, and of course even more unacceptable when great quantities of products are being processed.

From patent EP 2242692 B1 it is known how to realize an apparatus for filling semi-automatically a succession of containers with different kinds of products, through some steps comprising the initial weighing of a container wherein a first load of products has initially been introduced, and the successive introduction of a second load of products taken from at least two different feeders of similar products, wherein said second load of products is chosen according to their weight, which weight is previously measured based on the weight of the first load of products.

According to this patent said two different feeders of similar products and respective supplementary adding means of products are arranged in a transverse direction with respect to the motion of the products which make the first weighing load.

This solution is adequate for rather big products, and that are intrinsically vulnerable and therefore they must be handled with care and one by one, but it cannot be used effectively for other types of products, such as cherries, that because of their quantity and characteristics must be processed and handled in groups; further said patent requires that the containers are loaded while these are moving, and this fact further limits the apparatus efficiency as it increases its complexity; finally, said apparatus is preferably meant for loading manually the products in the respective container, and this of course requires the use of a certain number of staff, with further obvious burdens with respect to a completely automated operation.

From patent WO 10000890 it is known a solution able of realizing an apparatus and a method for the automatic loading of containers with products of different kind, wherein the load weight is exactly dosed; to the purpose this method is characterized in that there are arranged single hoppers determining different partial loads previously defined and weighed, and in that it is realized and employed a special algorithm for choosing and associating all and only those partial loads that on the whole form a weight as near as possible to a pre-defined optimal weight.

This solution, conceptually similar to the previous one, anyway is complex from the mechanical and operating point of view, as it is necessary to provide a certain number of hoppers and respective feeding and unloading organs, and it is necessary also to provide a respective number of weighing organs, and because of the complexity of handling the products before forming the final load.

Furthermore, the presence of hoppers is compatible with very robust, hard and invulnerable agricultural products such as potatoes, but it is unacceptable when it is required to handle much softer products and in limited quantities, such as when loading cherries into simple baskets for the final distribution and consumption.

In conclusion the above mentioned apparatuses have clear and insurmountable intrinsic limits which do not allow to effect a dosed load of vulnerable products in a succession of containers particularly meant for the final consumption, which are simple, harmless, automatic and suitable to process products both in groups or singularized, and which do not imply using more than one weighing organ.

It would therefore be desirable, and it is the main object of the present invention, to provide a type of automatic apparatus suitable for the automatic weighting and loading of an amount of agricultural products whose weight is measured exactly, able of overcoming the described constraints.

Such purpose is achieved by an apparatus realized and operating according to the appended claims.

Figure 2:
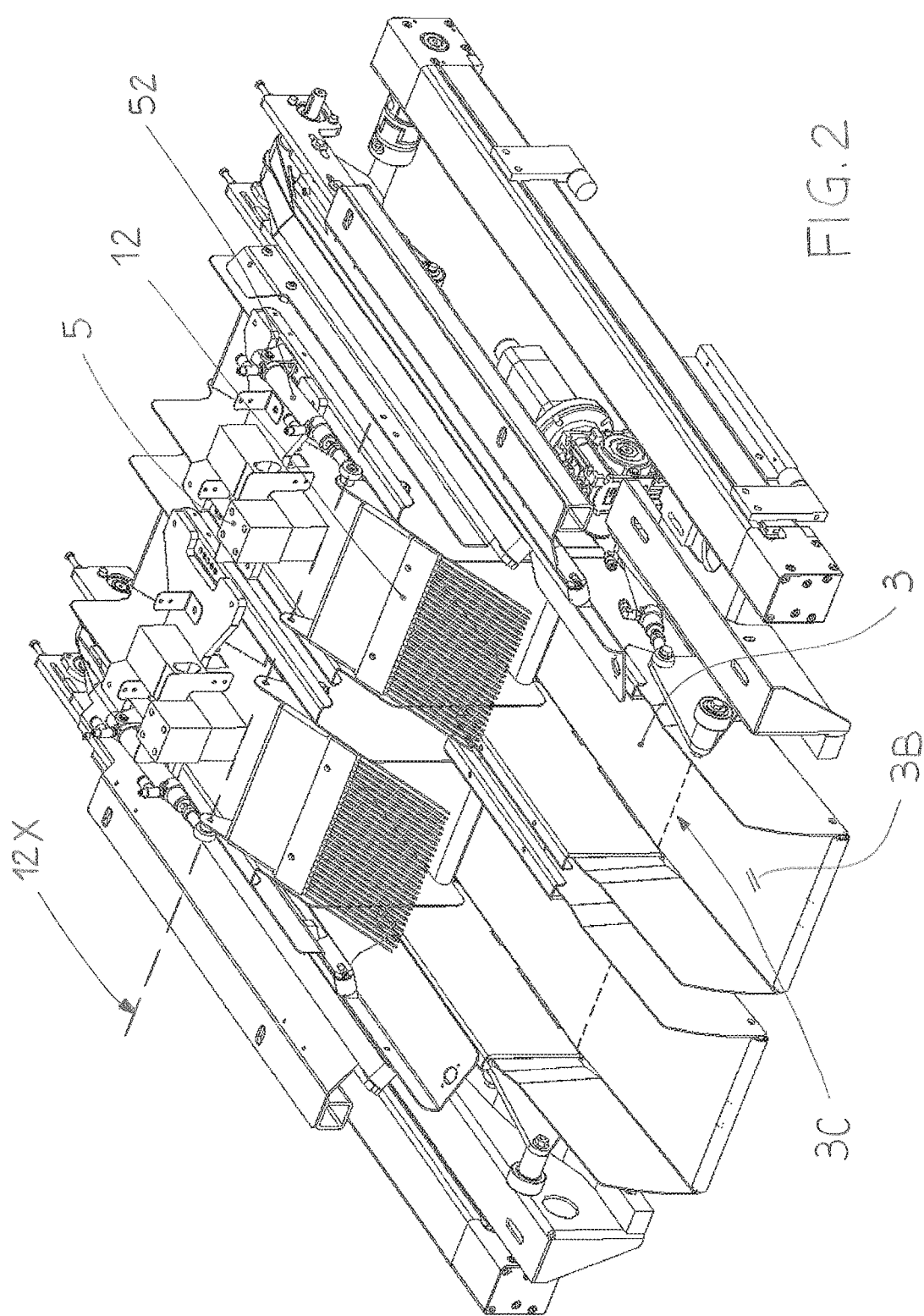
Figure 9:
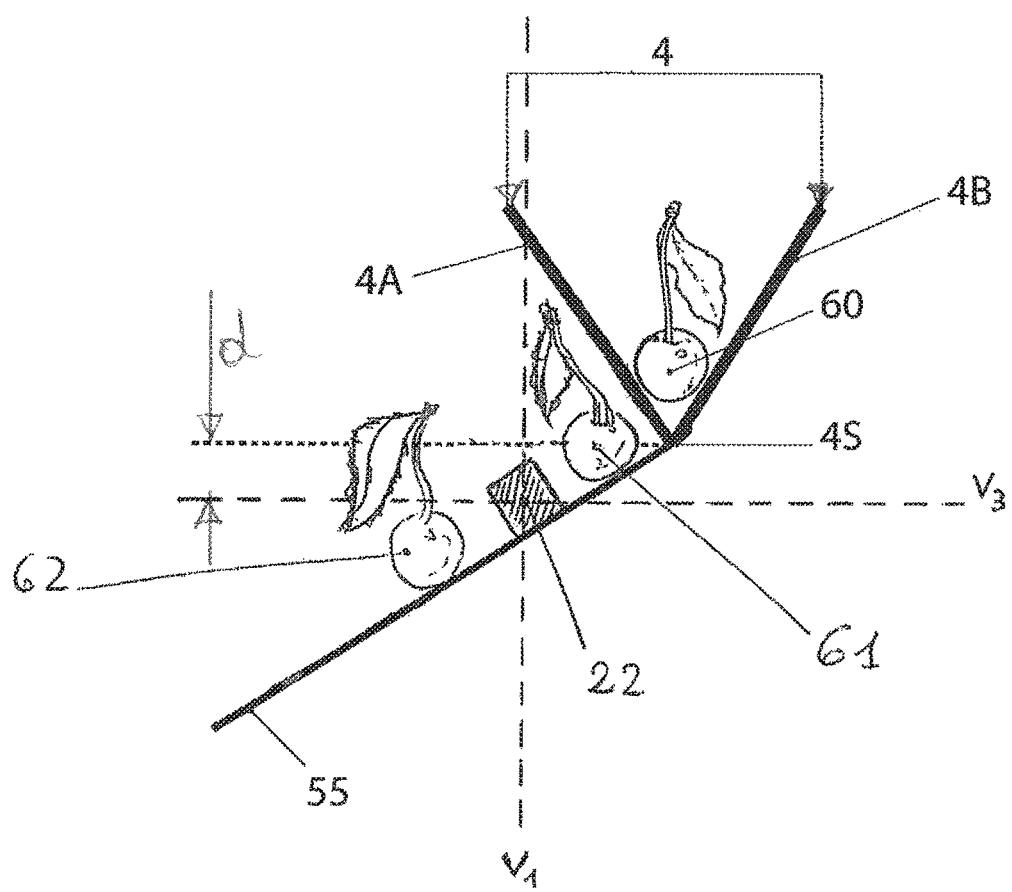
Figure 10:
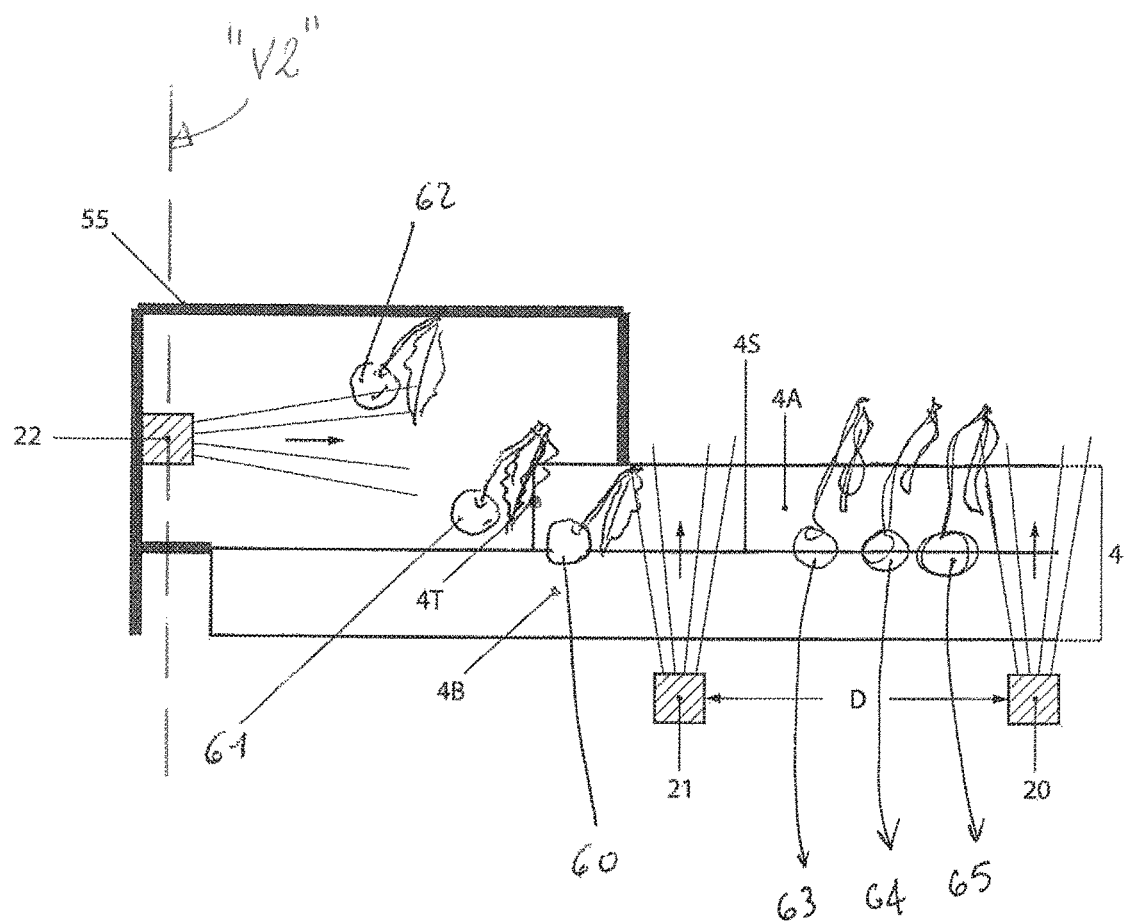
Figure 11:
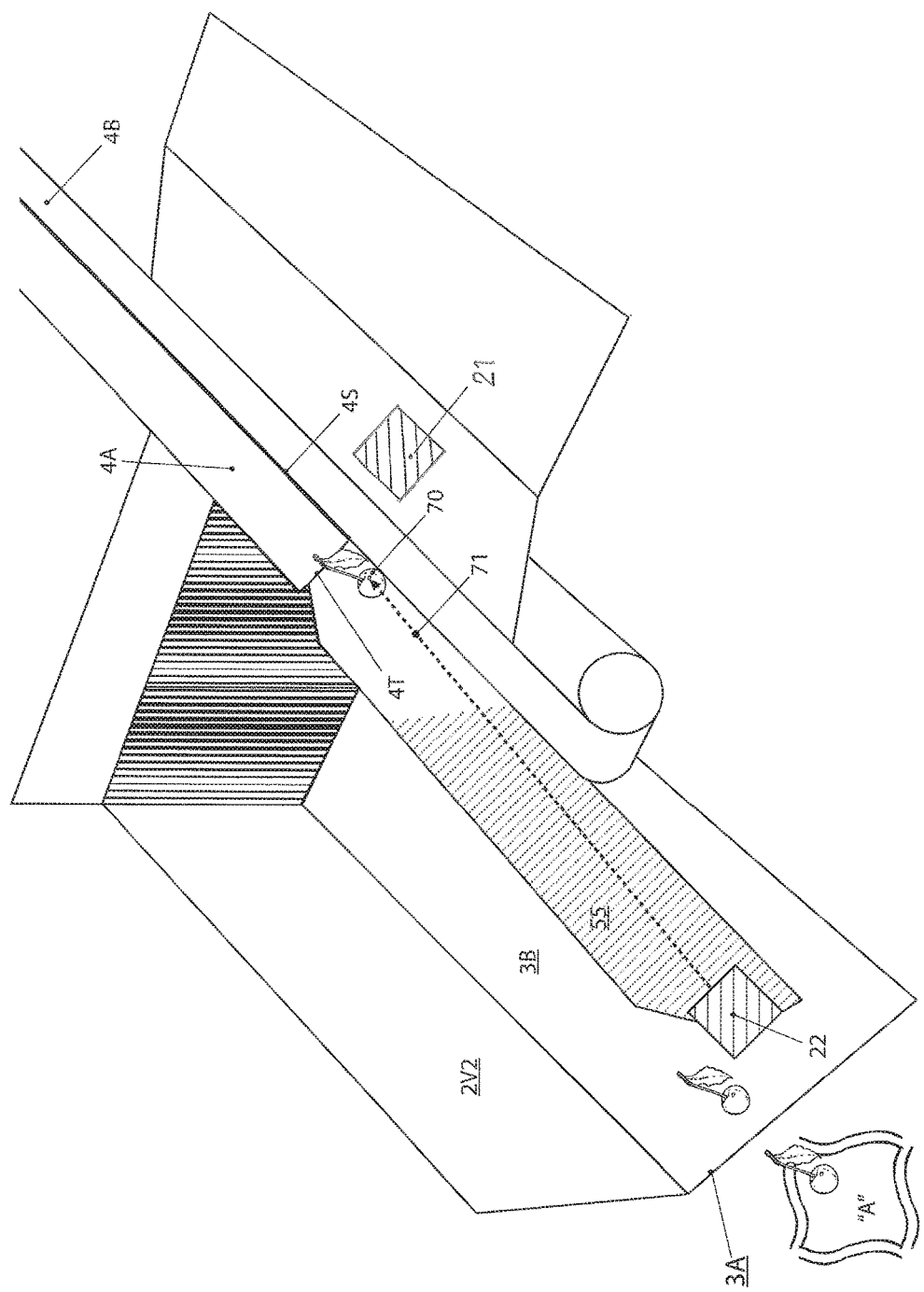
Figure 12:
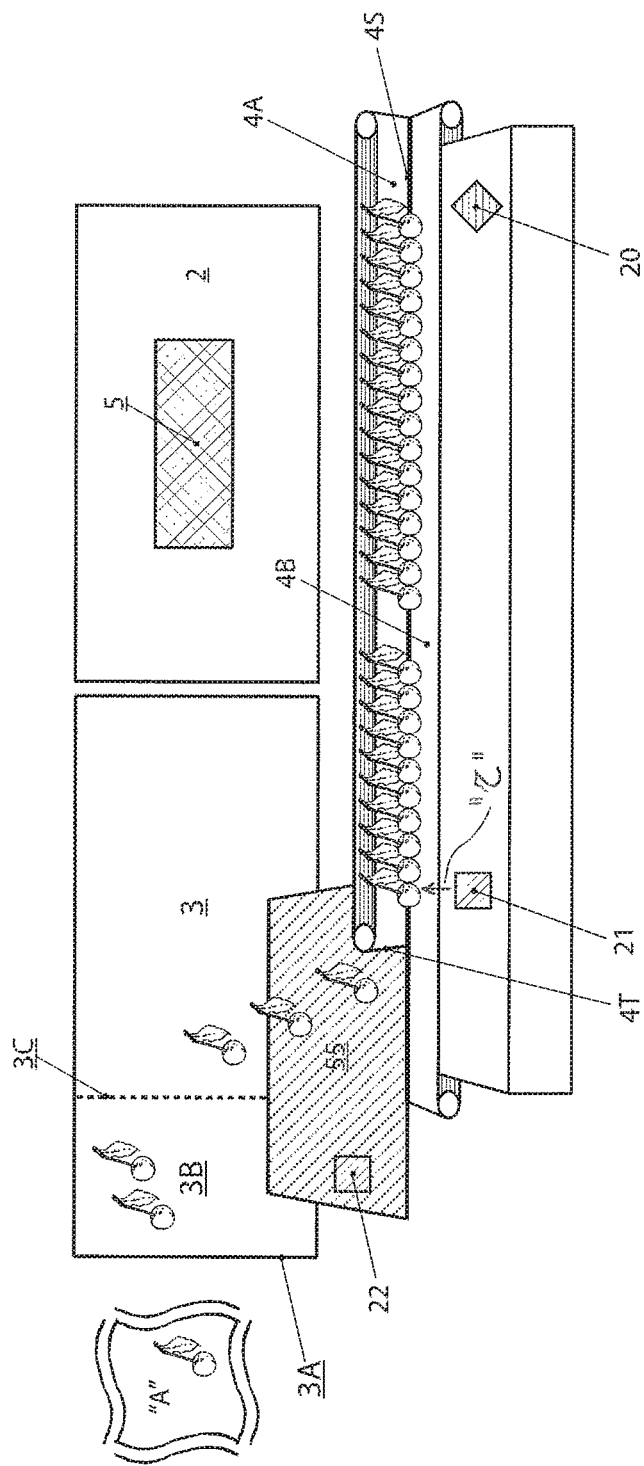
Figure 13:
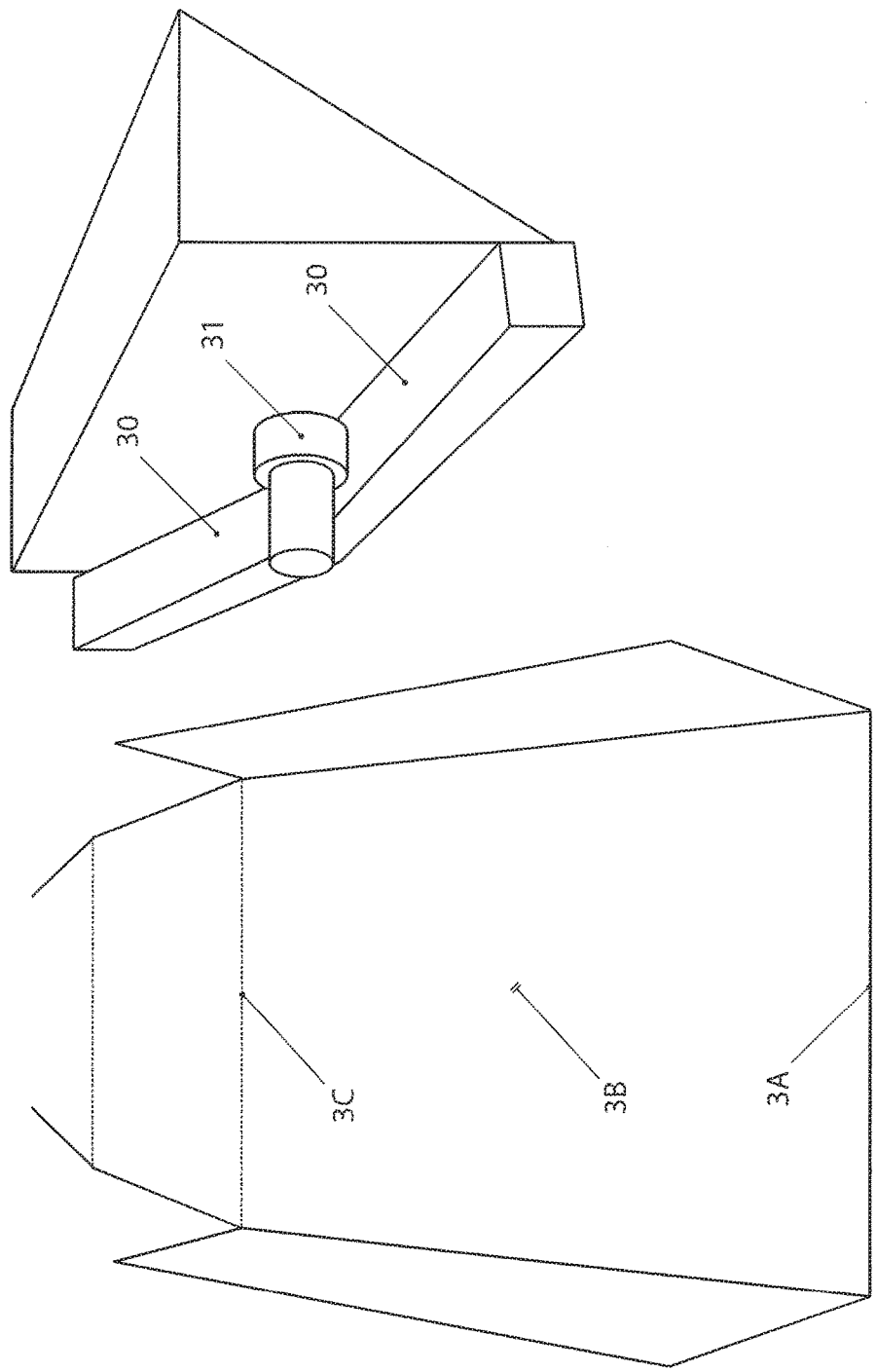

Characteristics and advantages of the invention will be apparent from the following description, for exemplification only but not limited to, with reference to the appended drawings, wherein:

FIG. 1 shows an external perspective view and from a diagonal position of an apparatus according to the invention, in a first operating condition, FIG. 2 shows a view similar to FIG. 1, in a second operating condition, FIG. 2A shows a plan view of the apparatus of FIG. 2 seen from the top, FIG. 2B shows a plan view of the apparatus of FIG. 2 seen from the side, FIG. 3 shows a view similar to FIG. 1, in a third operating condition, FIG. 3A shows a view similar to FIG. 2B, in the operating condition of FIG. 3, FIG. 4 shows a general external perspective view of the apparatus of the previous figures, figures from 5 to 8 show respective symbolic plan views of the apparatus of the previous figures, seen from the side, in as many different operating conditions, FIGS. 9 and 10 schematically show respectively an enlarged view respectively according to section B1-B1 of FIG. 2A, and a symbolic enlarged view of a portion, comprised in the closed line "I", of the same figure, FIG. 11 shows an enlarged pictorial view of a particular of FIG. 2, FIG. 12 shows an enlarged pictorial view of a particular of FIG. 2A, FIG. 13 shows an enlarged pictorial view of a particular of FIG. 3, seen from a different point of view.

With reference to the appended figures, an apparatus for automatically dosing a succession of agricultural products in a plurality of single containers "A", "B", "C", . . . comprises:
- a first conveying means 1, preferably a belt,
- a second conveying means 2 placed downstream of the first conveying means 1 and able of being loaded with agricultural products supplied by said first conveying means 1 and released by the latter at the end of its travel,
- a third conveying means 3 placed downstream of said second conveying means 2 and able of being loaded with the agricultural products supplied by said second conveying means 2 and released by it at the end of its travel.

Figure 5:
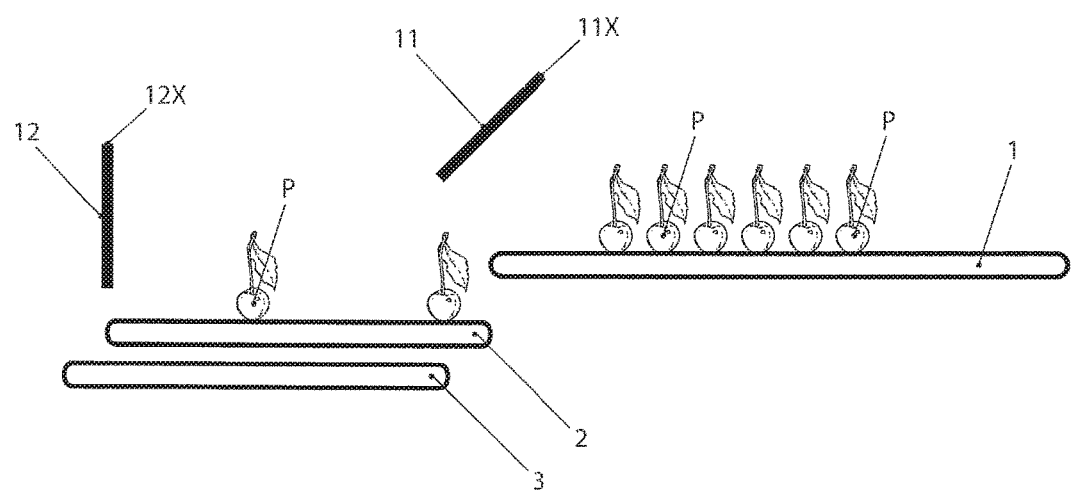

In order to allow all the products transferred by said conveying means to be poured onto the successive conveying means, it is necessary for the "upstream" conveying means to be at a level substantially higher than the respective "downstream" conveying means, as symbolically exemplified in FIG. 5, wherein it can be seen that the level "h" of the first conveying means 1 is placed at a level higher than the level "k" of the successive second conveying means 2; similarly between said second conveying means 2 and said third conveying means 3.

Said second conveying means 2 is provided with devices apt at weighing the products, (and generally any kind of body) laid and present on the same, and in particular it is provided with a load cell 5.

As it will be described in detail later, said third conveying means 3 can be moved to different positions, more or less advanced, but always being below the second conveying means 2, therefore it is necessary that this load cell 5 apt at weighing those products is not below said conveying means 2, but above, as shown in the figures.

Therefore it is also advantageous, in order not to make the apparatus too complex, that said weighing means 5 weigh the whole structure of said second conveying means 2, then including associated organs such as engine, respective connections, an activatable barrier 12 provided at the end of the conveyor 2 and respective actuator 52 which will better describe hereinafter, and the lateral walls 53, 54 which flank and define said conveyor 2.

Direct consequence of such configuration of the conveyor 2 is that the actual weight to be measured and corresponding to the products on the same is obtained by the difference between the total weight measured by said weighing means and the unladen weight, known and constant, of said whole structure of the second conveying means 2.

Said third conveying means is used in order to receive the products just weighed by said second conveying means 2 and transferred into single containers "A", "B", "C" . . . , which, according to a technique widely used in the field, are positioned before the third conveying means 3, in the sense that they are at the end of the respective travel. Said third conveying means 3, after having received the weighed products by the second conveyor 2, transfers and puts them into each one of said containers, one by one until they are filled up.

After a single container has been filled up, it is removed and a successive empty container takes its place, and the filling cycle starts again.

In order to allow a gentle filling of the products into their respective containers, said third container 3 is made apt at:
- proceeding to a position towards and above the container that at that moment is in the filling phase,
- and modifying partially its shape so that its outer part 3B which is on the vertical axis of the container below, is also bent or partially rotated downward, as it can be clearly seen in FIGS. 3, 3A and 7.

Practically, said outer part 3B is made to perform a "bow", so that it bends lowering itself up to almost the level of the bottom of the container being loaded so as to make a sort of slipway which facilitates a slow and gentle fall of the product onto the bottom of the container.

Said first conveying means 1 and said second conveying means 2 are provided with respective mobile barriers 11 and 12 that are arranged at the end of the respective conveying means 1 and 2 and are activatable into two arrangements; in a first arrangement they are closed and therefore they are apt at blocking the flow of the products from a conveyor to the successive downstream conveyor; in a second arrangement they are open and therefore they allow the free flow and conveyance between a conveyor and the successive.

Said two barriers are activatable singly or selectively by means of actuating means known per se, and therefore they will not be described any further.

The specific operation of said two barriers with respect to the operation of the whole apparatus will be described in detail hereinafter.

Furthermore, as shown in the figures, said two mobile barriers 11 and 12 are realized as rotating doors which open and close by rotating with respect to a respective horizontal axis 11X, 12X arranged on the higher part of the respective mobile barrier 11 and 12 and placed in the transverse sense to the respective conveyor 1 and 2.

The apparatus is also provided with a fourth conveying means 4 whose purpose and operation will be described later; in principle, said fourth conveying means can be made in any way provided that it is able of transporting singled products and of transferring them, in a selectively controllable way, towards and into said conveyor 3. Anyway, with reference to FIGS. 1, 2, 3, 9, 10, 11, 12, it is preferably formed by a guide shaped as a "V" and it is arranged in a position adjacent to said second conveying means 2 and parallel to it.

With reference to FIGS. 1, 2, 3, 11, 12, two photo-cells 20, 21 are associated to said fourth conveyor 4 and arranged so as to be able to detect the presence or absence of products in respective positions of said fourth conveyor 4 and spaced of a respective distance "D".

Finally, it is provided a third photo-cell 22, ideally similar to the previous ones, which is positioned in order to detect the presence of falling products or conversely the absence of products falling down from the end edge of said fourth conveying means 4.

For this purpose, and with reference to FIGS. 9 and 10, said third photo-cell 22 is arranged in a position which is in the intersection between:
- a vertical plane "V1" passing through an inclined wall of said fourth "V"-shaped conveying means, in particular through the wall 4A of the "V"-shaped fourth conveying means 4, which is nearer to said second conveying means 2,
- a vertical plane "V2" (FIG. 10) arranged transverse to said third and fourth conveyors 3, 4 and placed downstream the end edge 4T of said fourth "V"-shaped conveyor,
- a horizontal plane "V3" passing below the lower corner 4S of said fourth "V"-shaped conveying means.

In regard to the position of said third photo-cell 22, it is basically positioned on a horizontal plane, but above all rearward, that is towards the space underneath said end edge 4T of said fourth "V"-shaped conveyor, so that, as it will become more apparent hereinafter, it is apt at detecting the presence or not of products falling from said lower corner 4S of said "V"-shaped fourth conveyor.

Figure 7:
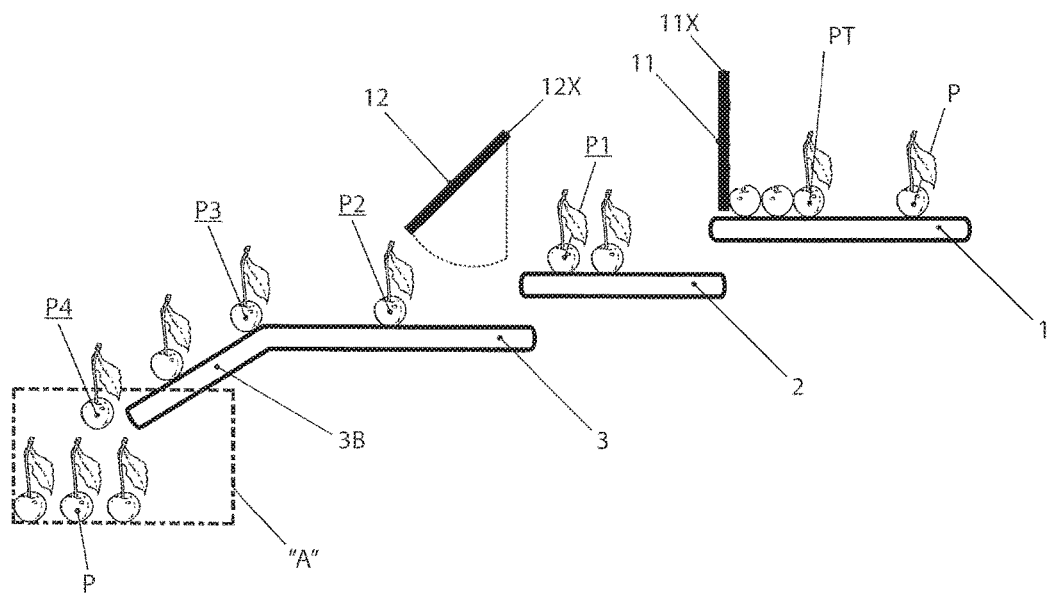

With reference to said third conveyor means 3, keeping in mind its purpose of allowing the gentle filling of the products into the respective containers by going on towards and above the container that at that moment is being filled, and to the partial change of its shape so that its end part 3B which at first is in a horizontal position and above the container that is going to be filled, is inclined as well, or partially rotated downward, as it can be very well seen in FIGS. 3, 3A, and 7 it is made able of being shifted through a combined motion of going on and rotation, so that its front edge 3A (FIGS. 3, 3A) is moved forth for a pre-defined distance "DP1" (see FIG. 2A) away from said second conveying means and is lowered for a pre-defined amount "DP2" (see FIG. 3A).

The mechanical organs for activating and guiding such combined motion are known per se and easily adaptable to the present application; with reference to figures, it is preferable to realize the solution which envisages that said transfer means comprise at least a cam guide 30 (FIGS. 1, 13) placed on a side of said third conveying means 3 and able of engaging to a guide pin 31, suitably connected with said third conveying means 3 so that, as shown in particular in FIG. 13, when said guide pin 31 reaches the end of said cam guide 30, said front edge 3A is inclined forward and downward, so as to acquire the required lower position.

The operation of the described apparatus is as follows: the products to be introduced into the containers, usually baskets "A", "B", "C" . . . at first are loaded loose and casually, then in small groups as well, onto said first conveyor 1 which is continuously moving; therefore said products are carried to the final area of said conveyor 1 where the first barrier 11 is.

At first said first barrier 11 is open, and the conveyor 1 moves continuously, carrying on loading with products the second conveyor 2; this preferably moves with a step-by-step motion, so as to facilitate a uniform distribution of the products on the same conveyor 2.

When the products reach said second closed barrier 12, of course they are stopped by it, piling up against it.

When it is measured that the weight on said conveyor 2 has reached a pre-determined amount, said first barrier 11 is closed, and at the same time the respective conveyor 1 is stopped.

Soon after the second barrier 12 is open, and the second conveyor is actuated with a continuous motion so as to pour quickly the respective load of products onto the successive third conveyor 3 below.

After the conveyor 2 has unloaded all the products on the conveyor 3 below, said barrier 12 is closed again, said first barrier 11 is reopened, and at the same time the first conveyor 1 resumes its motion in order to form a new load on the conveyor 2.

During this phase the whole assembly comprising the conveyor 2 and its associated organs, such as the respective motor, the barrier 12, and the respective actuator, said possible vertical walls 53, 54 are continuously weighed by a suitable device, preferably a load cell 5 arranged high and above the conveyor 2, since, as it will be seen later, under it, it must be placed also the third conveyor 3 and hence it would be difficult to make said two organs coexist substantially in the same small space.

During said continuous weighing phase, the weighing values successively measured are sent to a command and control unit, not specifically shown, which, in a similarly continuous way compares those successive weighing values with respect to a pre-defined gross value, described hereinafter.

This pre-defined gross value corresponds to the sum:
- of a pre-defined net weight value of the products as a whole at that moment present on said second conveyor 2,
- and of the known and constant weight of the whole structure of the second conveyor 2, therefore, omitting the obvious explanation relative to:

"net weight=gross weight−unladen weight"

it effectively occurs the condition that the net weight, that is the weight of only the products present on the conveyor 2, is measured in real time, and similarly compared, in real time, to said pre-defined net weight.

As soon as this pre-defined net weight value is exceeded, the first barrier 11 is closed, which interrupts the inflow of new products, and soon after the second barrier 12 is open; furthermore the continuous motion of said second conveyor 2 moves forth the respective products, until they are released onto the third conveyor 3, below said second conveyor; this is caused to move forward and to incline in its front part so as to make its said front edge 3A enter a container underneath in the desired way and depth, so that finally the products are laid onto the bottom of the same container with the desired gentleness.

It is here reminded and pointed out that, in principle, filling a container with products whose weight is measured continuously, and stopping it when said weight exceeds a pre-defined value, is a well known technique.

As it has been said at the beginning, this circumstance creates some inconveniences basically due to the fact that the weighing of the whole load of the products on the second conveyor 2 is intrinsically approximate, imprecise, and anyway, even if it were precise, it would not guarantee the possibility of loading an amount of products with the desired weight on the second conveyor 2, as the inflow of the products is casual, but also quick, and this causes a rather changeable loading on the second conveyor 2 before said first barrier 11 can be closed.

In essence, it is pointed out that the possible precision of the weighing means would not ensure, by itself, that the final load sent into each container is determined close to the desired final weight with precision.

This problem is solved as follows:
- first of all, it is necessary to start from the definition of an optimal weight "PO" which is desired to load into the container; this optimal weight must be higher than the contractual weight to be loaded, that is the minimum weight (of the products) under which it is not possible to deliver the container, but it must also exceed said contractual weight by a minimum amount so as not to deliver excess products;
- furthermore, it is defined the nominal weight or mean weight "PM" of the products to be loaded on the fourth conveyor 4; in order to ensure that this weight is substantially constant and known, the respective products are previously measured;
- further, it is defined a "warning weight" which is referred to as "PG" with reference to the conveyor 2 already loaded with the products, which ensures with a suitable certainty that when the "warning weight" is reached, the respective weight measured on the products is lower than said optimal weight; therefore reaching said "warning weight" "PG" automatically causes the suspension of the loading of the products;
- finally, it is established that the weight of the products actually present and weighed continuously on the second conveyor 2 is defined as "PT"; it is finally started the loading of the products on the second conveyor 2, and said weight (real) "PT" is continuously measured;
- in the same way, that is continuously, it is calculated the value of "PO"–"PT" obtaining the value of weight still "missing", that is the "completion load" that is needed to add to the load already present on the second conveyor 2, in order to reach the desired target weight "PO";
- it is assumed that each product of said completion load is a single and general product whose said unit mean weight "PM" is known in a substantially precise way, as it has previously been measured;
- it is continued loading products on the conveyor 2 until the related continuously measured weight "PT" is at least the same as said "warning weight" "PG"; at this point the loading of new products is stopped, and it is calculated:

$$(PO-PT)/PM=N$$

"N" is then the number of the pre-measured products of the completion load that have to be added to the products present (PT) on the second conveyor 2 in order to obtain, in fact, a final load whose weight is basically the same as or as close as possible to the desired one "PO".

To the purpose, it is arranged said fourth conveyor 4 which is used to introduce therein a sequence of products nominally similar to those loaded onto the first conveyor 1, said fourth conveyor 4 has to make it possible to transport the respective products 60, 63, 64, 65 (see FIG. 10) in a singularized way, and that is the reason why it is "V"-shaped, wherein the two opposed inclined sides are realized by two belts moving in a synchronous way, so that the products that are laid onto it are automatically and spontaneously singularized and lined up one after the other.

Said fourth "V"-shaped conveyor is known per se in the art, and therefore it will not be described any further.

As it can be seen in particular in FIGS. 1, 9, 10, 11 and 12, said fourth conveyor 4 is arranged parallel to conveyors 1, 2 and 3, and preferably moving in the same direction, so as to facilitate the pouring of the respective products onto and then into the third conveyor 3.

Further, the side 4A facing and near the conveyors 1, 2 and 3, is shorter than the other side 4B, and ends with an end edge 4T which is basically in correspondence of the third conveyor 3; it has to be noted that said end edge 4T is not a defined physical part of said fourth conveyor 4, but only a fixed position in the apparatus successively reached by all the sections of said fourth conveyor 4.

Logical and final effect of the foregoing is that when the successive products 60, 61, 62, 63, 64, 65 . . . , transported by the fourth conveyor 4, reach said end edge 4T, they, not any more supported by said side 4A, automatically fall onto and into the third conveyor 3 together with the other products poured therein by the second conveyor 2.

Finally all the products present in the third conveyor 3, that is those poured by the conveyor 2 and those poured by the conveyor 4, are all together finally poured into the respective container being loaded.

Advantageously, in order to facilitate a gentle fall and not a free fall of the products from the fourth conveyor 4, a slipway 55 is arranged placed below said end edge 4T and bent so as to slow the descent of the successive products.

It is now considered the matter of counting the number "N" of the products poured from the conveyor 4 into the conveyor 3.

In correspondence of said fourth conveyor 4 there are provided two photo-cells 20, 21 each of which adjusted so as to detect the presence or absence of respective bodies, that is of products, present in respective transverse sections of said fourth conveyor 4.

In particular the second photo-cell 21 is arranged so as to detect the presence/absence of products in correspondence, and just before, of said end edge 4T as schematically shown in FIG. 12, where it is shown that its detection ray "r" basically detects the presence of products in the end part of the fourth conveyor 4.

The purpose of the two photo-cells 20, 21 is that of maintaining the fourth conveyor always full, so that the latter acts as a buffer that ensures definitely and promptly the filling of the necessary amount of products until it is reached the desired amount of the whole load inside the container being loaded at that moment; normally, then, only a part of the products present on said fourth conveyor 4 are simultaneously unloaded towards the same container.

Therefore, after having determined said number "N", said fourth conveyor 4 is actuated so as a succession of single products is made to fall from said end edge 4T.

Said third photo-cell 22, placed and adjusted as previously described, therefore become able of detecting the amount of products which are poured by the fourth conveyor 4 onto said third conveyor 3, as each fallen product is detected singularly; when said number "N" is reached, the fourth conveyor 4 is stopped, since the overall load whose weight is the required target-weight "PO" has been poured on the third conveyor 3.

At the same time, or subsequently, said fourth conveyor 4 is filled with new products so as to allow a new controlled pouring; to the purpose, said second photo-cell 21 detects whether and when there are products in correspondence of said edge 4T and, when it detects the absence of products, it generates a signal that makes said fourth conveyor 4 advance, this is previously fed, with a succession of already measured products by the opposed part of said edge 4T, as said above.

When said fourth conveyor 4 transports the succession of new products again before the second photo-cell 21, it is of course stopped until the successive cycle; anyway the replenishment with new products on the conveyor 4 is carried on by the other means upstream of the latter, and not specifically described; such replenishment goes on until the first photo-cell 20, arranged at the beginning of the fourth conveyor 4, detects the constant presence of new product, which means that the fourth conveyor 4 downstream, already stopped, is completely filled; therefore it is restored the initial condition with the fourth conveyor 4 filled but stopped awaiting a new operation command, that is an advancement one.

Figure 6:
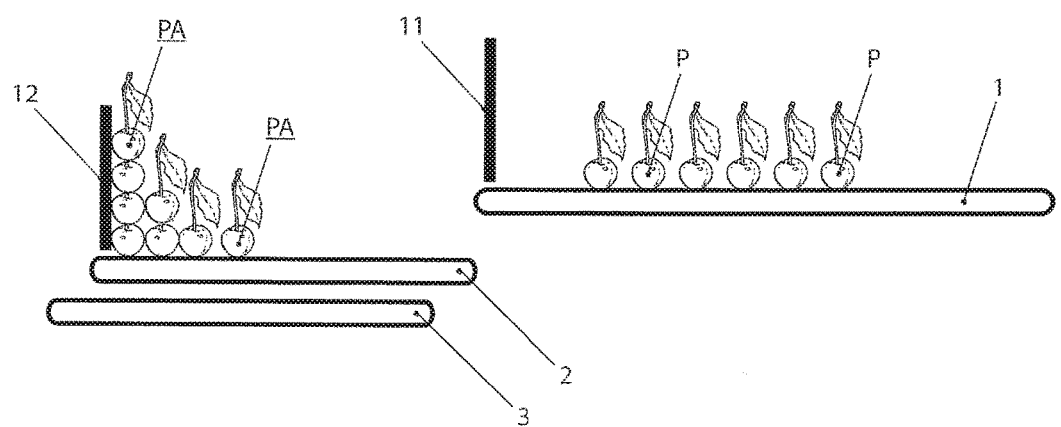
Figure 8:
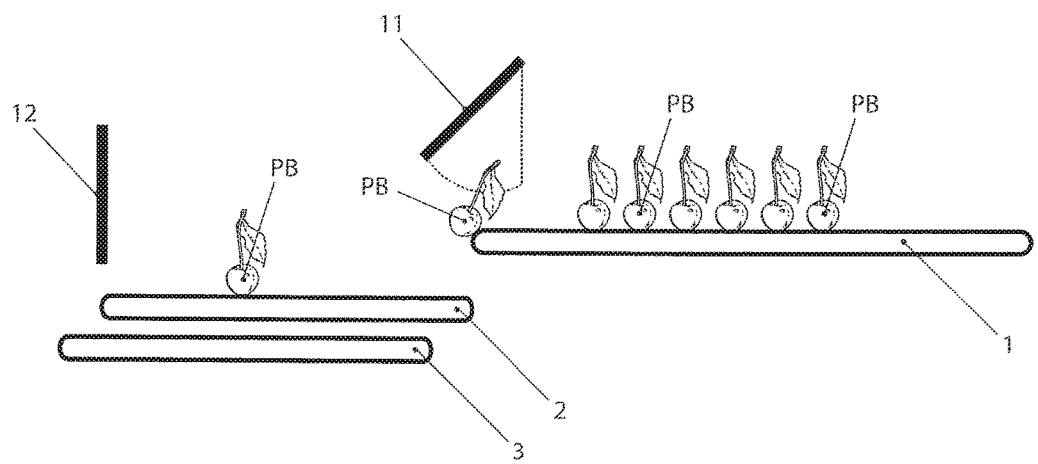

With reference to figures from 5 to 8, it is hereinafter described a synthesis of some of the most relevant phases of how the conveyors 1, 2 and 3 operate:

FIG. 5 shows a first configuration wherein the first conveyor 1, constantly working, transports the products "P" towards the second conveyor 2; the first barrier 11 is of course open, while the second conveyor 2 is working and moves the products towards the respective closed barrier 12. In this phase the conveyor 2 continuously weighs the load of products that progressively are transported thereon;

FIG. 6 shows a successive phase wherein, after having reached the pre-defined warning weight "PG", the barrier 11 is closed to prevent a new inflow of products on the second conveyor 2; it is to note that in this phase the products "PA" have been stopped by the barrier 12, which of course has piled them one on the other;

FIG. 7 shows the subsequent phase wherein, due to the closing of the barrier 11, also the respective conveyor 1 is stopped so as to avoid that the products "PT" are progressively piled up against it and consequently damaged by their brushing against the conveyor whereon they are laying; soon after the third conveyor 3 is made to advance which, due to the cam 30 and the pin 31, is sort of "plunged" forward and inside the container "A" which at that moment is before in order to be loaded, subsequently the barrier 12 is opened, which makes the products P1, P2, P3, P4 flow respectively from the second conveyor 2 to the third conveyor 3, from this to said outer part 3B, to end finally (P4) inside the container "A";

FIG. 8 shows the next phase, wherein the third conveyor 3 is again pulled back below the conveyor 2, in order to be ready again to be plunged again into a successive container, while the second barrier 12 is closed again and the first barrier 11 is re-opened, so as to be arranged in exactly the same configuration as the one in FIG. 5.

From here the loading of a new container is started again in a cyclical way.

Even though not specifically described, the calculation of the previously defined number "N" of products to be counted and poured from the fourth conveyor 4 is carried out exactly between the phases in FIGS. 6 and 7, of course the weight "PG" on the conveyor 2 has been verified, which in fact makes the calculation of "N" possible, and before, or also during the phase in FIG. 7, when all the products directed towards the container to be loaded, that is both those poured by the second conveyor 2, and both those poured by the fourth conveyor 4, are poured inside the third conveyor 3.

The operation of the described apparatus is possible only by means of a central and integrated control of all the involved functionalities and devices; in particular it has to comprise in general control and command means, not specifically described, which are capable of actuating in a selectively controllable way:
said first and second barrier 11 and 12,
the operation/stop of said first, second and third conveyors 1, 2 and 3, the operation/stop of the fourth conveyor 4.

Furthermore said command and control means have to be able of receiving the signals from said weighing means 5 and from said photo-cells 20, 21 and 22.

Finally they have to be able of receiving and storing the quantitative data related to the describe operation method, and in particular the data related to the various levels of the defined weights, so as to allow the execution of the calculation:

$$(PO-PT)/PM=N$$

as described before.

The invention claimed is:

1. Apparatus for the automatic dosing of a succession of definite quantities, as a weight, of agricultural products into a plurality or respective containers wherein it comprises:
   a first conveyor,
   a second conveyor positioned to be loaded with agricultural products supplied by said first conveyor,
   a third conveyor positioned to be loaded with products supplied by said second conveyor,
   weighing means for determining the full weight of said second conveyor and products loaded on said second conveyor,
   wherein said third conveyor is configured to transfer products laying thereon into a succession of containers,
   and a fourth conveyor configured to convey an additional numerically controlled quantity of said agricultural products onto said third conveyor, said numerically controlled quantity being determined as a function of the weight of the products present on said second conveyor.

2. Apparatus according to claim 1, wherein
   said fourth conveyor a V-shaped configuration
   and said fourth conveyor is configured to transport the products in a succession of substantially individual products.

3. Apparatus according to claim 2, wherein said fourth conveyor is arranged adjacent to said second conveyor.

4. Apparatus according to claim 1, wherein said weighing means are arranged over said second conveyor.

5. Apparatus according to claim 1, further comprising:
   a first barrier for selectively separating said first conveyor from said second conveyor; and,
   a second barrier for selectively separating said second conveyor from said third conveyor.

6. Apparatus according to claim 5, further comprising:
   a first and a second product detectors positioned to detect the presence of products on said fourth conveyor,
   and a third product detector associated with said fourth conveyor and configured to detect products conveyed from said fourth conveyor onto said third conveyor.

7. Apparatus according to claim 6, further comprising command and control means for controlling and coordinating the operation of said first, second, third and fourth conveyors and said first and second barriers based upon information processed by said weighing means and said first, second and third product detectors.

8. Apparatus according to claim 7, wherein said command and control means are configured to determine said numerically controlled quantity based on the ratio:

$(PO-PT)/PM=N$, wherein "PO" is a pre-defined reference weight, and "PT" is the actual and continuously measured weight of the products lying on said second conveyor, and "PM" is a pre-defined weight.

9. Apparatus according to claim 6, wherein said third product detector is arranged at the end of said fourth conveyor and is configured to detect products falling from said fourth conveyor onto said third conveyor.

10. Apparatus according to claim 6, wherein said product detectors comprise photocells.

11. Apparatus according to claim 5, wherein said first and second barriers are each rotatable around a respective horizontal axis which extends in a direction substantially transverse to the direction of travel of the first and second conveyor, respectively.

12. Apparatus according to claim 1, further comprising transfer means for shifting said third conveyor through a combined motion linearly and in rotation, whereby the front edge of said third conveyor is moved forward and away from said second conveyor and is lowered a pre-determined amount.

13. Apparatus according to claim 12, wherein said transfer means comprise at least a cam guide associated with said third conveyor, and a guide pin associated with said third conveyor and engaging said cam guide.

14. Apparatus according to claim 1, wherein:

said first conveyor is arranged on a level higher than the level of said second conveyor, and the second conveyor is arranged on a level higher than the level of said third conveyor.

15. Apparatus according to claim 1, wherein said first conveyor comprises a belt.

* * * * *